(12) United States Patent
De Bruin et al.

(10) Patent No.: US 10,006,703 B2
(45) Date of Patent: Jun. 26, 2018

(54) LOW PROFILE SOLAR DRYING TUNNEL

(71) Applicant: GRAINPRO, INC., Concord, MA (US)

(72) Inventors: Tom De Bruin, Kibbutz Haogen (IL); Lewis Donovan Strickland, Subic Bay Freeport Zone (PH)

(73) Assignee: GRAINPRO, INC., Concord, MA (US)

( * ) Notice: Subject to any disclaimer, the term of this patent is extended or adjusted under 35 U.S.C. 154(b) by 426 days.

(21) Appl. No.: 14/696,586

(22) Filed: Apr. 27, 2015

(65) Prior Publication Data

US 2015/0253077 A1 Sep. 10, 2015

Related U.S. Application Data

(63) Continuation-in-part of application No. 13/444,063, filed on Apr. 11, 2012, now Pat. No. 9,015,956.

(60) Provisional application No. 61/474,121, filed on Apr. 11, 2011, provisional application No. 62/100,492, filed on Jan. 7, 2015.

(51) Int. Cl.
| | |
|---|---|
| *F26B 3/32* | (2006.01) |
| *F26B 19/00* | (2006.01) |
| *F26B 3/28* | (2006.01) |
| *F26B 25/16* | (2006.01) |
| *F26B 9/10* | (2006.01) |

(52) U.S. Cl.
CPC .............. *F26B 3/283* (2013.01); *F26B 3/286* (2013.01); *F26B 9/10* (2013.01); *F26B 25/16* (2013.01); *F26B 2200/06* (2013.01); *Y02B 40/74* (2013.01)

(58) Field of Classification Search
CPC .. F26B 3/283; F26B 3/286; F26B 9/10; F26B 25/16; F26B 25/066; F26B 25/063; F26B 25/14; F26B 2200/06; Y02B 40/74
USPC ...................... 34/522, 93; 366/114, 200, 213
See application file for complete search history.

(56) References Cited

U.S. PATENT DOCUMENTS

| | | | | |
|---|---|---|---|---|
| 4,458,673 | A * | 7/1984 | Benjamin ................ | F24J 2/243 126/624 |
| 2003/0033793 | A1* | 2/2003 | Fairbanks ................ | A01D 7/10 56/400.1 |
| 2006/0081340 | A1* | 4/2006 | Kneebone ................ | B01D 1/30 159/1.1 |
| 2007/0256318 | A1* | 11/2007 | Sugawara ................ | F26B 3/286 34/93 |
| 2010/0006575 | A1* | 1/2010 | Ring ........................ | B65F 1/10 220/495.06 |

\* cited by examiner

*Primary Examiner* — John McCormack
(74) *Attorney, Agent, or Firm* — Alphapatent Associates, Ltd; Daniel J. Swirsky; Ricki L. Simon

(57) ABSTRACT

A solar drying tunnel having a low-profile and which is transportable includes a bottom portion, a cover, and externally controlled manually operated access mechanism for turning grain over. The tunnel may also include one or multiple ventilators at one end to keep the cover up and to provide air flow.

14 Claims, 12 Drawing Sheets

LOW PROFILE SOLAR DRYING TUNNEL

CROSS-REFERENCE TO RELATED APPLICATIONS

This application is a continuation-in-part of U.S. patent application Ser. No. 13/444,063, filed Apr. 11, 2012, which claims the benefit of U.S. Provisional Patent Application No. 61/474,121, filed on Apr. 11, 2011, the contents of which applications are incorporated herein by reference in their entirety. This application also claims the benefit of U.S. Provisional Patent Application No. 62/100,492, filed on Jan. 7, 2015, the contents of which application are incorporated herein by reference in their entirety.

BACKGROUND

The invention is directed to a solar drying tunnel with a low profile and which is easily transportable.

In a conventional greenhouse or solar dryer, there is generally a bottom surface and a ceiling that is at a height suitable for human beings to enter. In the case of a grain dryer with a transparent dome, grains may be placed on the bottom surface, and a human being will enter the dryer to turn the grains so that they can dry on all surfaces. The dome is generally transparent so as to provide solar gain, also known as the "greenhouse effect." Conventional greenhouses or similarly designed solar dryers are tall and expensive, and are not transportable.

A transportable system for drying grains or seed is the Collapsible Drying Case (CDCTM) (GrainPro, Inc.). The CDCTM is made of a heavy-duty black Poly Vinyl Chloride (PVC) surface as a bottom portion for placing the grains thereon, and, in case of rain, it can be folded halfway so that half the PVC surface acts as a cover that can be zipped onto the other half so that the grains or seeds can be protected during rain. The CDCTM also includes handles for transport. However, it does not benefit from solar gain since it has no transparent cover. The grains in the CDCTM are dried in the open air and are turned manually.

SUMMARY

There is provided, in accordance with embodiments of the invention, a system for drying of grains or seeds. The system includes a solar dryer tunnel having a flexible bottom portion having a width and length, with a first end along the length and a second end along the length, the bottom portion for placement of grains or seeds thereon, a cover having a transparent material extending over the length of the bottom portion, and at least one ventilator positioned at the first end for holding up the cover, and further includes an external access mechanism in contact with the solar dryer tunnel. The external access mechanism may in some embodiments include a remote utensil, and in other embodiments may include a rolling mechanism. External access mechanism is a manually operated mechanism which is designed to cause the grains or seeds positioned on the bottom portion to turn over as the external access mechanism is moved. External access mechanism is not limited to the examples disclosed herein.

There is provided, in accordance with additional embodiments of the invention, a solar drying tunnel for drying of grains or seeds. The solar drying tunnel includes a flexible bottom portion having a width and a length, a cover made of transparent material and extending over the length of the bottom portion, and at least one ventilator configured for holding up the cover thereon when the ventilator is in a blowing state, wherein when the at least one ventilator is in the blowing state, a maximum height of the cover is less than or equal to 60 centimeters.

There is provided, in accordance with yet additional embodiments of the invention, a method for drying grain. The method includes placing the grain in a low-profile solar drying tunnel, providing an external access mechanism in contact with the low-profile solar drying tunnel, and manually turning the grain within the low-profile solar drying tunnel by moving the external access mechanism.

Unless otherwise defined, all technical and scientific terms used herein have the same meaning as commonly understood by one of ordinary skill in the art to which this invention belongs. Although methods and materials similar or equivalent to those described herein can be used in the practice or testing of the invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The above and further advantages of the invention may be better understood by referring to the following description in conjunction with the accompanying drawings in which.

Figure 1A:
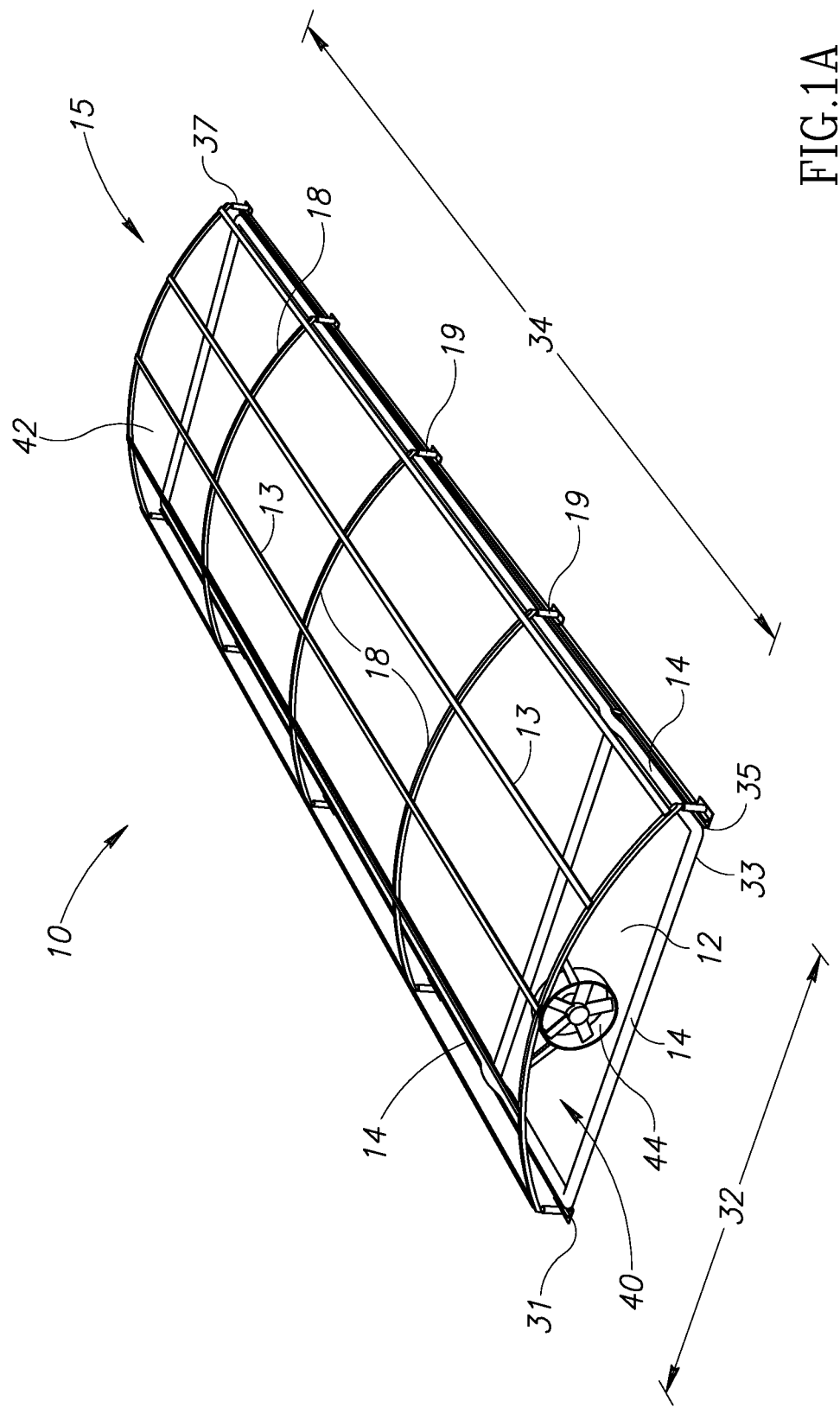
FIGS. 1A and 1B are schematic illustrations of a solar drying tunnel, without and with a cover, respectively, in accordance with embodiments of the invention.

It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of the invention. It will be understood by those of ordinary skill in the art that embodiments of the invention may be practiced without these specific details. In other instances, well-known methods, procedures, components and structures may not have been described in detail so as not to obscure the invention.

Embodiments of the invention relate to a solar drying tunnel which does not require entry of a human being or a remotely controlled motor for turning over the commodity, for example, grain or seeds, during a drying process, thus enabling the tunnel to have a low profile and to be easily transportable while allowing the grain or seed to be manually and remotely turned over during drying. An external access manually operated mechanism is provided for moving a portion of the tunnel or the commodity therein, thus turning the grains or seeds and eliminating the need for a high ceiling or a frequently detachable ceiling, for turning the grain. The tunnel also provides a transparent cover for solar gain to further enhance drying.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description and should not be regarded as limiting.

Figure 1B:
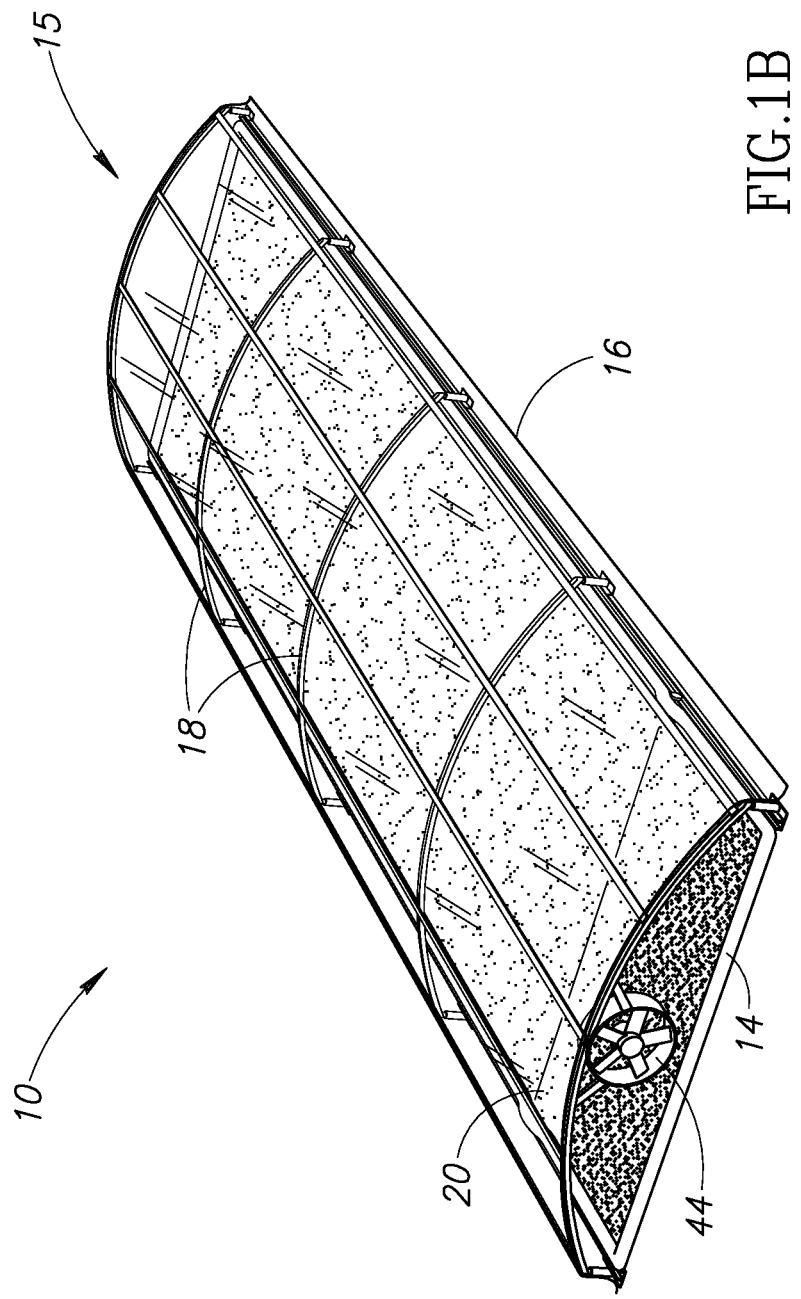
Figure 1B:
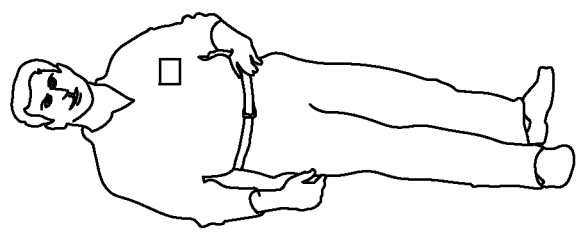

Reference is now made to FIGS. 1A and 1B, which are a schematic illustration of a solar drying tunnel 10, in accordance with embodiments of the invention. Solar drying tunnel 10 is depicted in FIG. 1A without a cover and without grains therein, and is depicted in FIG. 1B with a cover and with grains therein. Solar drying tunnel 10 includes a bottom surface 12, side portions 14, and a frame 15. Bottom surface 12 has a width 32 having a first width end 31 and a second width end 33, and bottom surface 12 has a length 34 having a first length end 35 and a second length end 37. A tunnel first end 40 is positioned at first length end 35 and extends along width 32 (i.e. from first width end 31 to second width end 33). A tunnel second end 42 is positioned at second length end 37 and extends along width 32 at second length end 37. Tunnel first end 40 is at least partially open and includes a ventilator 44 positioned at an opening of tunnel first end 40. Multiple ventilators 44 may be used as well. Tunnel second end 42 also includes an opening for exhaust. A view from tunnel first end 40 with ventilator 44 and opening 41 is further shown in FIG. 2. As shown in FIG. 1B, a cover 16 is positioned over frame 15. Bottom surface 12 is comprised of a flexible material, e.g., black plastic, such as black polyethylene (PE) or heavy-duty black reinforced Poly Vinyl Chloride (PVC), and is configured for placement of the grains or seeds thereon. Side portions 14 may be comprised of a separate material, or may be a continuation of the material of bottom surface 12 and may be held up by a support mechanism or by connecting the material of side portions 14 to cover 16. Side portions 14 are designed to prevent spillage.

Cover 16 is a transparent material that can protect the grains and seeds from rain, and also provides solar gain, also known as the "greenhouse effect", where incoming light is transmitted to heat the grain and the bottom black surface, and traps the heat generated by sunlight by being only slightly transparent to the infrared reradiated from the heated grain and heated bottom black surface. In some embodiments cover 16 is comprised of coated woven polypropylene. It should be readily apparent that other materials with good transparency to visible light and relatively opaque to infrared may be used as well. For example, transparent PE may be used for cover 16. It should be readily apparent that the invention is not limited to the examples listed herein and that any suitable transparent cover may be used.

In one embodiment, cover 16 is held up by frame 15. Frame 15 includes a series of rigid arches 18, which can have maximum heights of approximately 60 cm or less. In one embodiment, arches 18 are comprised of thin coated galvanized pipes. In other embodiments, arches 18 are semi-elliptical hoops without vertical walls, and are comprised of hollow PVC tubing, aluminum, or any other suitable material. In some embodiments, segments are designed for quick assembly in the field by snapping or screwing together.

Figure 2:
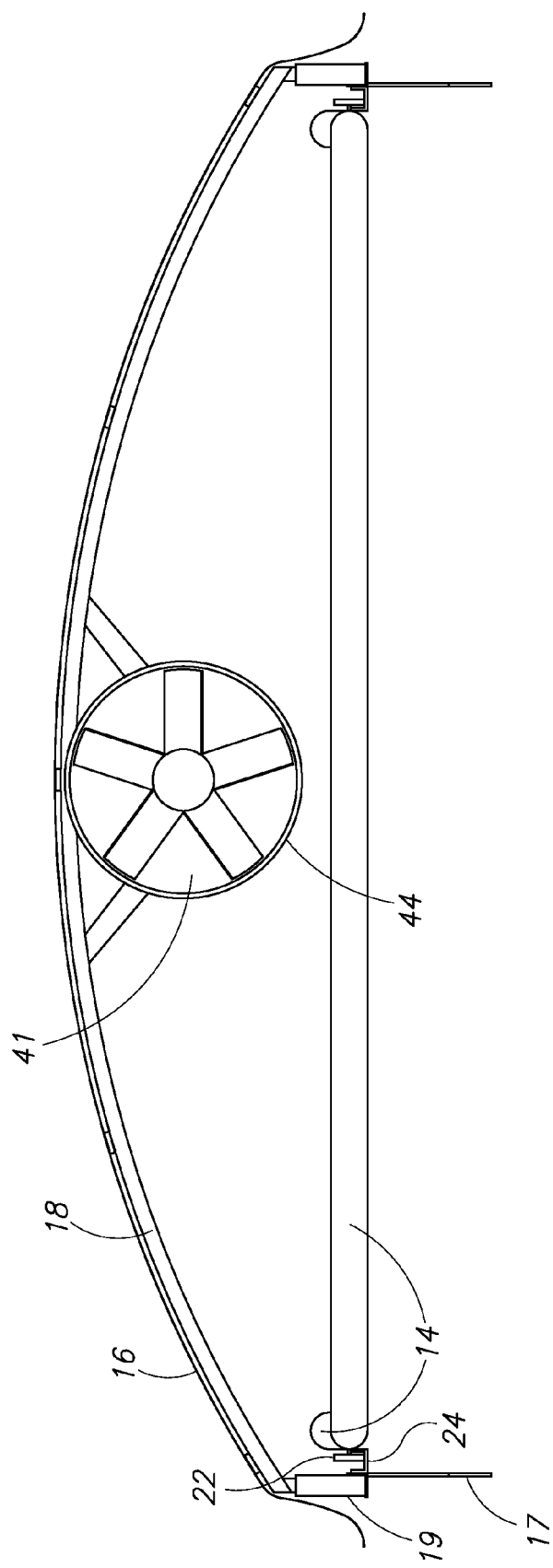
FIG. 2 is an illustration of the solar drying tunnel of FIGS. 1A and 1B, depicting a view from a first end of the solar drying tunnel.

Arches 18 are approximately 1 inch in diameter, although the dimensions may vary. Tunnel 10 for example, can be approximately 3 meters wide, and at least 15 meters long. Arches 18 are positioned approximately every 2 meters along the length of tunnel 10. Arches 18 may be inserted into holding pipes 19, which may be attached to pegs 17, as shown in FIG. 2. Pegs 17 may be driven into the ground with a mallet or hammer. Arches 18 may be attached to one another via attachment rods 13 for increased stability.

In another embodiment, frame 15 includes a single arch 18 positioned at tunnel first end 40. In this embodiment, frame 15 is configured to hold a ventilator 44 thereon, and cover 16 is partially held up by frame 15 and partially held up by air flowing from ventilator 44.

Ventilator 44, may be a fan, as depicted in FIG. 2, and is used for blowing air across a length of tunnel 10 and is further used for increasing air circulation. In some embodiments, ventilator 44 can be activated via solar cells using solar panels. In some embodiments, ventilator 44 may be controlled with a thermostat to control air velocity and thereby air temperature, to a predetermined maximum desired temperature. In some embodiments, ventilator 44 may be human-powered using a drive belt from a stationary bicycle. Air enters one end, and by forced convection flows across the tunnel; and as it is heated, it is exhausted through an exhaust opening at tunnel second end 42. This provides for quicker and more efficient drying of the grains and/or seeds. An ideal flow rate used as controlled by the fan is one which maintains a temperature close to the maximum permissible for a given commodity.

In the embodiment shown herein, there is no need to fold the drying sheet during rain or to provide a zipper to close the system, because transparent cover 16 provides rain protection as well as heat trapping.

Figure 8:
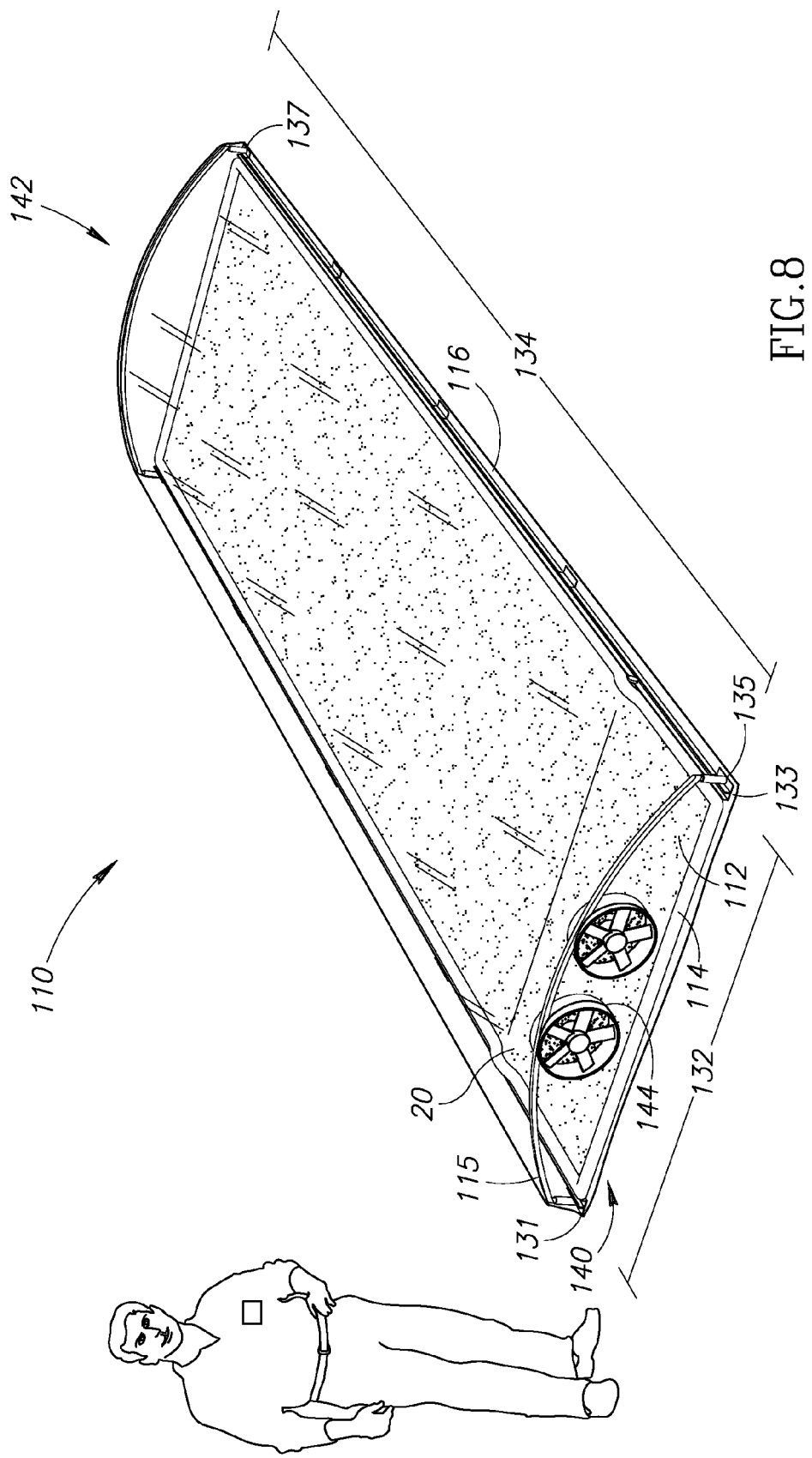
FIG. 8 is a schematic illustration of a solar drying tunnel with a cover and a single frame portion, in accordance with embodiments of the invention.

Reference is now made to FIG. 8, which is a schematic illustration of a solar drying tunnel 110, in accordance with embodiments of the invention. Solar drying tunnel 110 is depicted in FIG. 8 with a cover 116 and with grains therein. Solar drying tunnel 110 includes a bottom surface 112. Bottom surface 112 has a width 132 having a first width end 131 and a second width end 133, and bottom surface 112 has a length 134 having a first length end 135 and a second length end 137. A tunnel first end 140 is positioned at first length end 135 and extends along width 132 (i.e. from first width end 131 to second width end 133). A tunnel second end 142 is positioned is second length end 137 and extends along width 132 at second length end 137. Tunnel first end 140 is at least partially open and includes a ventilator 144 positioned at an opening of tunnel first end 140. Multiple ventilators 144 may be used as well. Tunnel second end 142 may also include an opening for exhaust.

Figure 9:
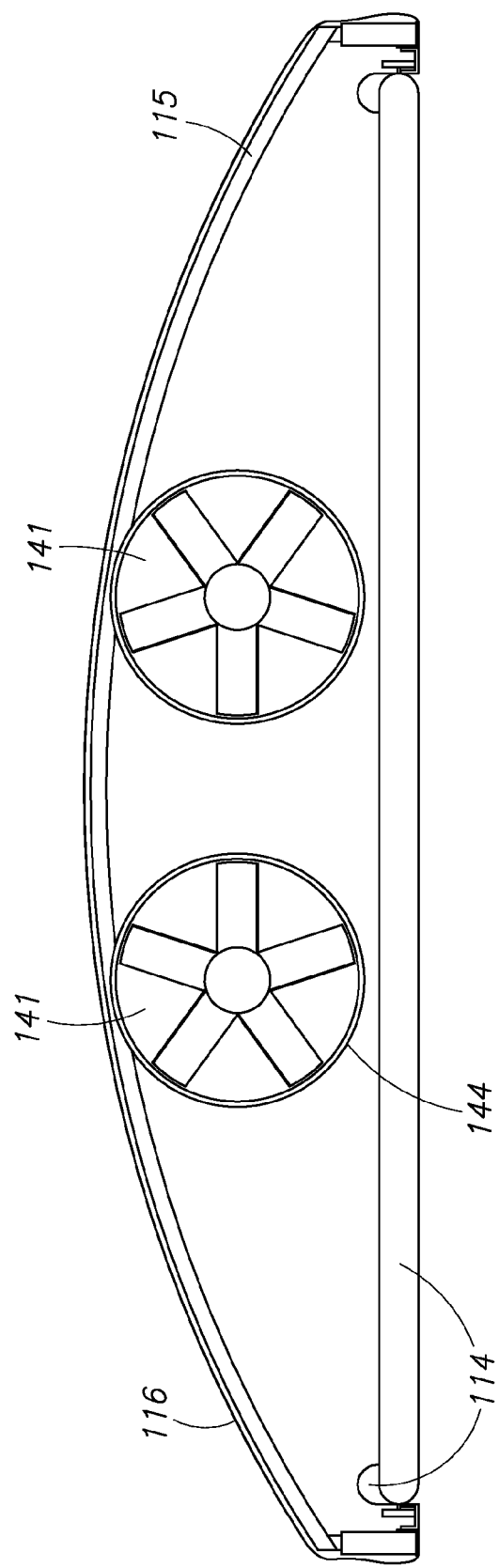
FIG. 9 is an illustration of the solar drying tunnel of FIG. 8, depicting a view from a first end of the solar drying tunnel.

A view from tunnel first end 140 is further shown in FIG. 9. A cover 116 is positioned over bottom surface 112, and grains are positioned on bottom surface 112 and covered by cover 116. Bottom surface 112 is comprised of a flexible material, e.g., black plastic, such as black polyethylene (PE) or heavy-duty black reinforced Poly Vinyl Chloride (PVC), and is configured for placement of the grains or seeds thereon. Side portions 114 may be comprised of a flexible, lightweight material, which may be, for example, a black plastic material.

Cover 116 is a transparent material that can protect the grains and seeds from rain, and also provides solar gain, also known as the "greenhouse effect", where incoming light is transmitted to heat the grain and the bottom black surface, and traps the heat generated by sunlight by being only slightly transparent to the infrared reradiated from the heated grain and heated bottom black surface. In some embodiments cover 116 is comprised of coated woven polypropylene. It should be readily apparent that other materials with good transparency to visible light and relatively opaque to infrared may be used as well. For example, transparent PE may be used for cover 116. It should be readily apparent that the invention is not limited to the examples listed herein and that any suitable transparent cover may be used.

Ventilators 144 may be suspended on a frame 115, placed at tunnel first end 140. Cover 116 is held up by frame 115 and by the use of at least one, and in some embodiments two, and in yet other embodiments more than two, ventilators 144. Ventilators 144 are positioned at open end 140 and are used for blowing air across a length of tunnel 100 so as to hold up cover 116 by the pressure produced by the flow of air. Ventilators 144 may also be used for increasing air circulation. In some embodiments, ventilators 144 can be activated via solar cells using solar panels. In some embodiments, ventilators 144 may be controlled with a thermostat to control air temperature by controlling fan velocity, to a predetermined maximum desired temperature. In some embodiments, ventilators 144 may be human-powered using a drive belt from a stationary bicycle. In some embodiments, a ventilation exhaust tube may be placed at closed end 142 so that air enters one end, and by convection flows across the tunnel; and as it is heated, it is exhausted through the ventilation exhaust tube. This provides for quicker and more efficient drying of the grains and/or seeds.

In the embodiment shown in FIG. 9, two ventilators 144 are positioned at tunnel first end 140 of solar dryer tunnel 110.

Figure 3:
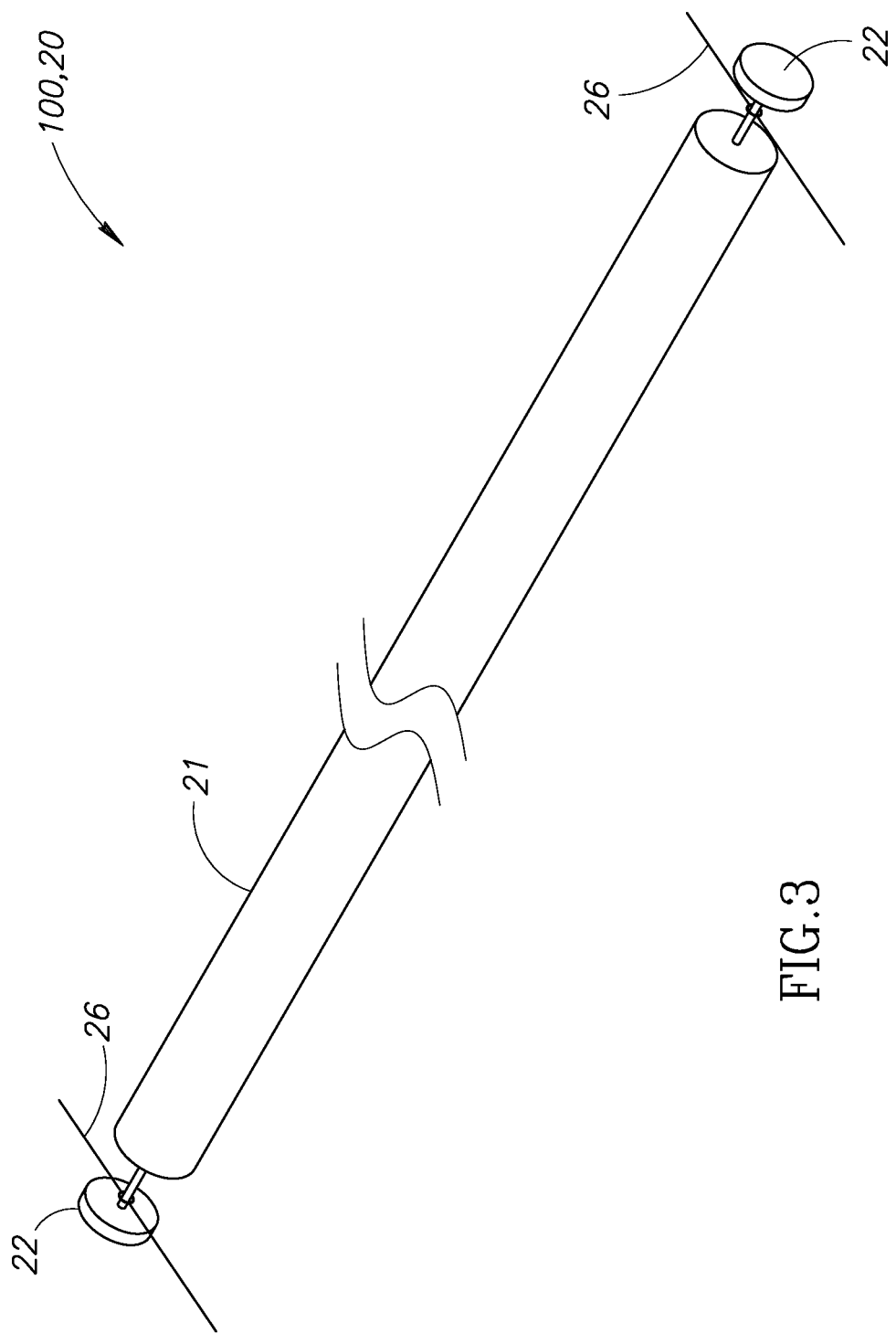
FIG. 3 is an illustration of a rolling mechanism for placement under the solar drying tunnel of FIGS. 1A and 1B, in accordance with embodiments of the invention.
Figure 5:
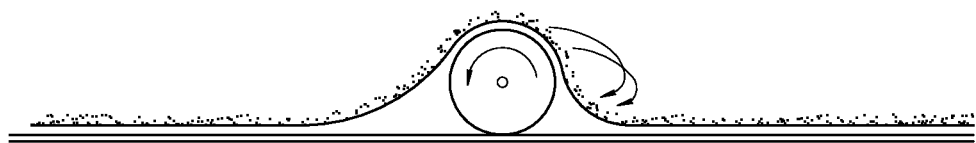
FIG. 5 is a schematic illustration of the rolling mechanism of FIG. 3, depicting grain in a process of being turned.

Reference is now made to FIG. 3, which is an illustration of an external access mechanism 100, in accordance with one embodiment of the invention. In the embodiment shown herein, external access mechanism 100 includes a rolling mechanism 20 for placement under the solar drying tunnel of FIGS. 1A and 1B and FIG. 8, in accordance with embodiments of the invention. Reference is made to FIG. 5, which is a schematic illustration of the rolling mechanism 20 of FIG. 3, depicting grain in a process of being turned over. Solar drying tunnel 10 or 110 includes the rolling mechanism 20 for externally turning grain or seeds to facilitate drying. Rolling mechanism 20 is an external mechanism for creating a ridge in the bottom surface 12 thereby turning the grains, which enables a low profile design by eliminating the need for either a human to enter the tunnel or for a remotely controlled motor drive. Rolling mechanism 20 includes a roller bar 21 having wheels 22 at each end. Roller bar 21 may be, for example, a PVC pipe with approximately a 4 inch diameter. Rolling mechanism 20 is positioned under bottom surface 12 of tunnel 10. Roller bar 21 may be pulled manually from outside via a pulling mechanism 26 such as a rope on each side.

In some embodiments, wheels 22 may run on rigid tracks 24 placed on the sides of tunnel 10 or 110, as depicted in FIG. 2. Rigid tracks 24 may be lightweight tracks and are used to guide wheels 22, similar to ball bearings or roller bearings used in a desk drawer, for example. Roller bar 21 may be pulled manually from outside via a pulling mechanism 26 such as a rope on each side. As roller bar 21 is pulled, it forms a moveable ridge in bottom surface 12 or 112, which causes the grain to tumble and turn over, facilitating uniform drying or exposure of all sides of the commodity to sunlight and air, as shown in FIG. 5. In other embodiments, no track is used, and roller bar 21 is simply placed under bottom surface 12 or 112 and moved mechanically by pulling such as by two ropes, one on either side.

For loading and unloading of grains and/or seeds, cover 16 or 116 may be lifted. Alternatively, grains or seeds may be introduced via flaps that are then re-attached to the base, as is common in greenhouse designs.

In embodiments of the invention, air enters at tunnel first end 40 or 140, and by forced convection flows across the tunnel; and as it is heated, it is exhausted through an opening at tunnel second end 42 or 142. This provides for quicker and more efficient drying of the grains and/or seeds.

Figure 6:
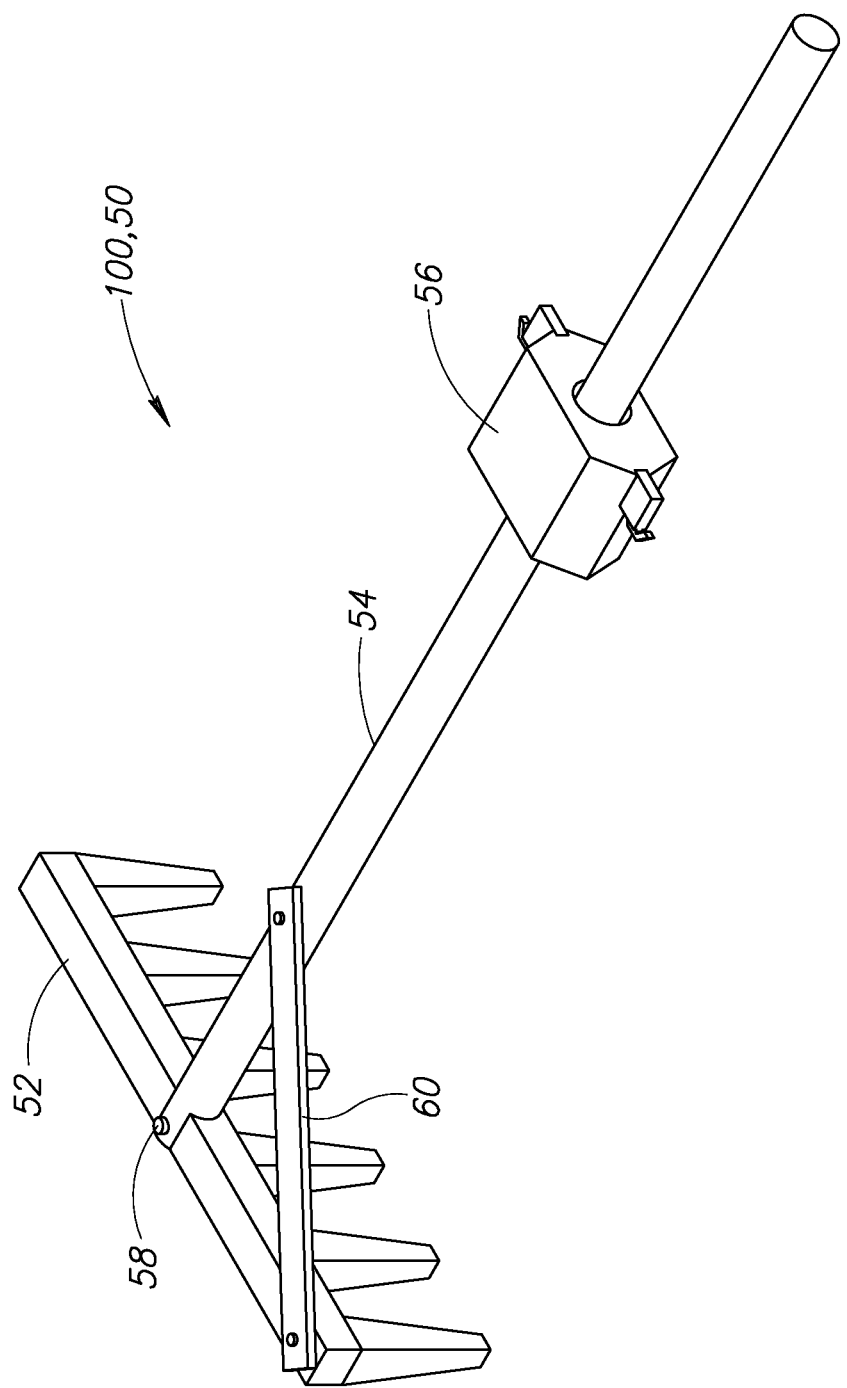
FIG. 6 is a schematic illustration of a remote utensil, for use in embodiments of the invention.

Reference is now made to FIG. 6, which is a schematic illustration of external access mechanism 100 in accordance with additional embodiments of the invention. In the embodiment shown herein, external access mechanism 100 includes a remote utensil 50 for mixing and turning the grain. Remote utensil 50 includes a raking portion 52, a handle 54, and a holder 56 positioned on handle 54. Holder 56 is movable along handle 54. Remote utensil 50 may be, for example, a rake, or any other utensil suitable for mixing or shuffling a commodity such as grain. Remote utensil 50 further includes a fastener 58 for fixedly attaching handle 54 to raking portion 52. In some embodiments, a diagonal connector 60 further attaches handle 54 to raking portion 52.

Holder 56 is designed to attach remote utensil 50 directly to cover 16 or 116 of solar drying tunnel 10 or 110, and allow for remote utensil 50 to move within solar drying tunnel 10 or 110 with two degrees of freedom: back and forth, and side to side, as will be described in further detail hereinbelow.

Figure 7A:
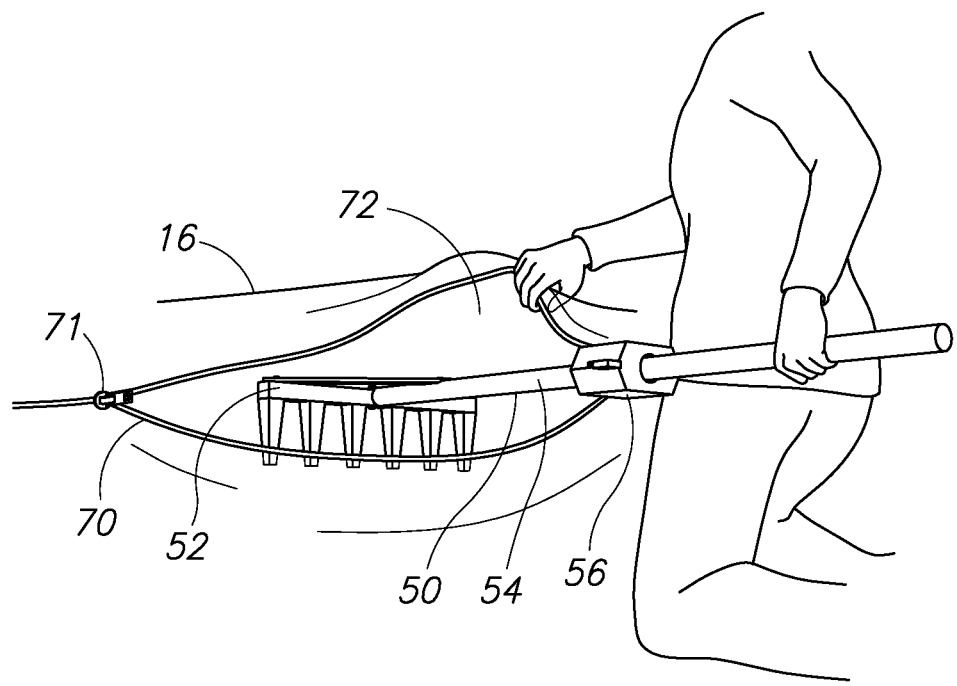
FIGS. 7A-7E are illustrations of the remote utensil of FIG. 6 in contact with and coordinated use with the solar drying tunnel of FIGS. 1A and 1B and of FIG. 8.
Figure 7B:
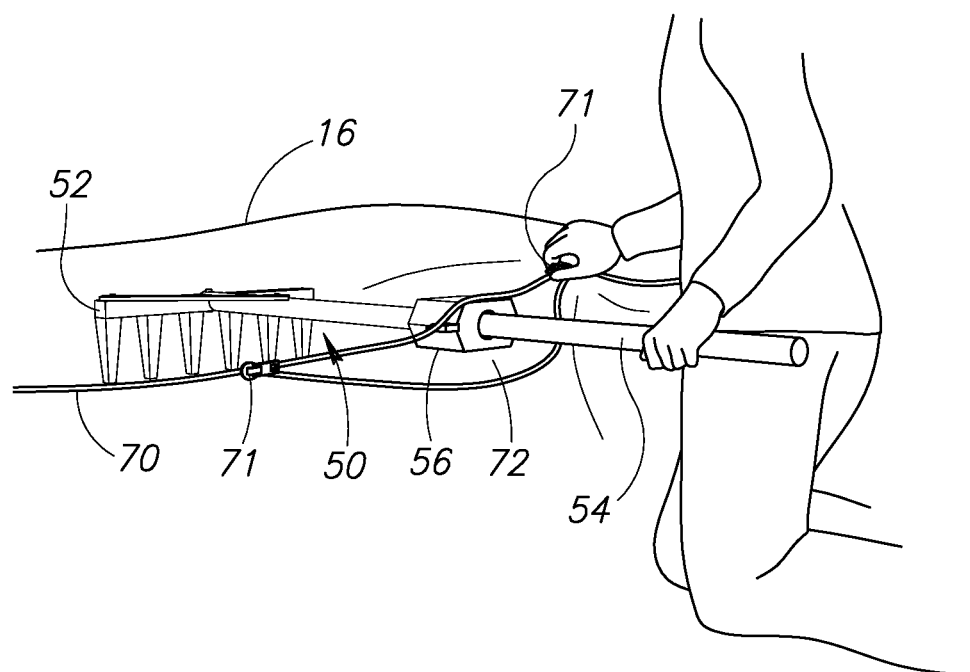
Figure 7C:
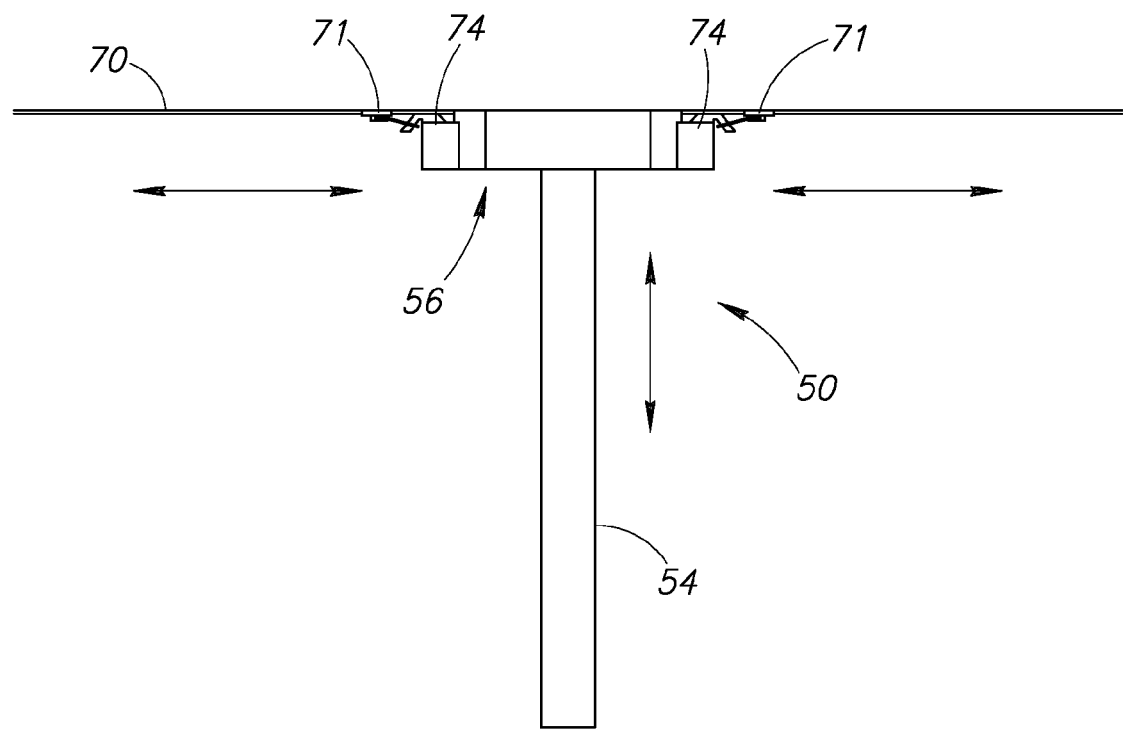
Figure 7D:
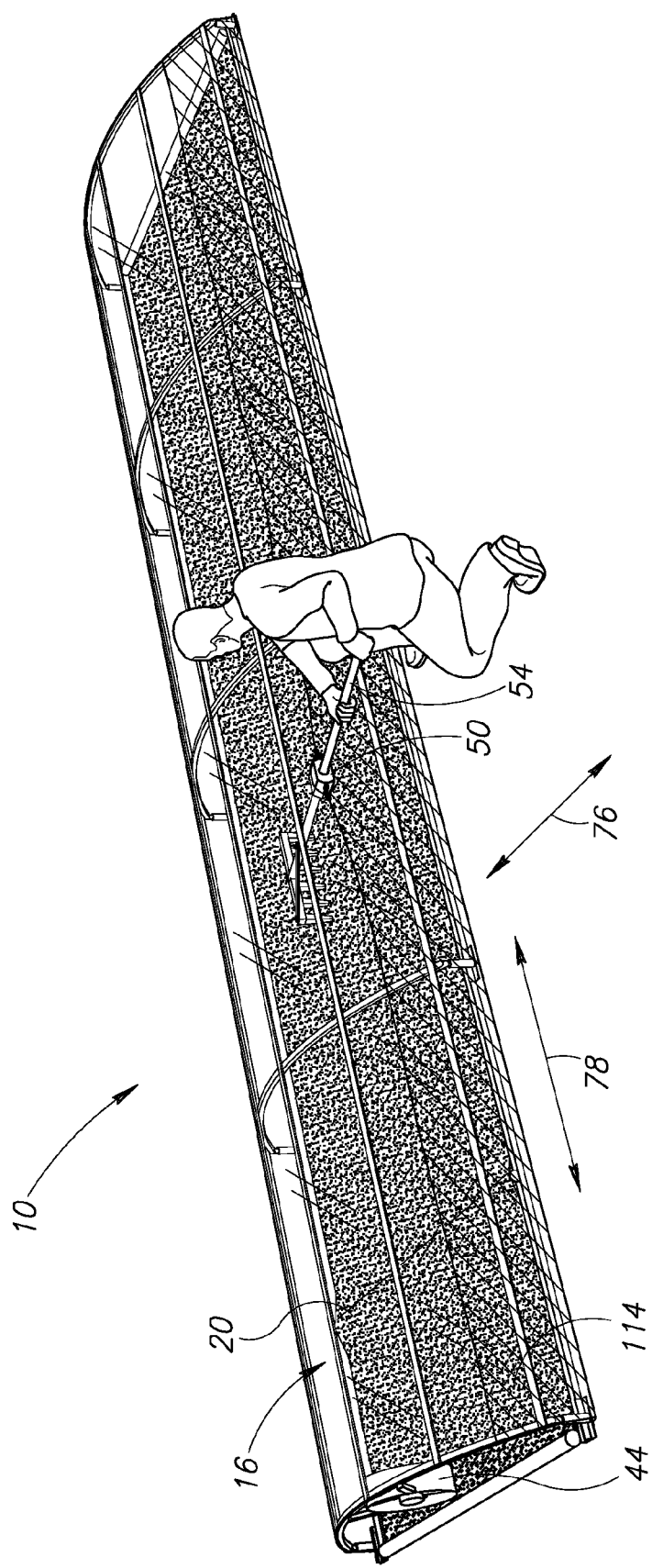

Reference is now made to FIGS. 7A-7E, which are illustrations showing cover 16 or 116, having a zipper track 70 and two zipper sliders 71 for attaching cover 16 or 116 to side portions 14 or 114, while enclosing remote utensil 50 in between cover 16 or 116 and side portions 14 or 114. In one embodiment, side portions 14 are a continuation of bottom portion 12 or 112. As shown in FIG. 7A, remote utensil 50 is introduced into solar dryer tunnel 10 through an opening 72 of cover 16. As shown in FIG. 7B, holder 56 is aligned with zipper track 70, while raking portion 52 of remote utensil 50 is positioned within solar dryer tunnel 10. As shown in FIG. 7C, which is a top view illustration of handle 54 and holder 56, in accordance with embodiments of the invention, holder 56 includes zipper head attachment pieces 74, which are configured to attach to zipper heads 71 on cover 16, thus locking holder 56 onto cover 16. This configuration allows for closure of cover 16 and side portions 14, with remote utensil 50 sandwiched between top and bottom layers, and accessible from outside of solar drying tunnel 10. As shown in FIGS. 7C and 7D, a user can move remote utensil 50 back and forth across a width of solar dryer tunnel 10 by sliding handle 54 back and forth through holder 56 in a first direction, as depicted by first arrows 76.

Figure 7E:
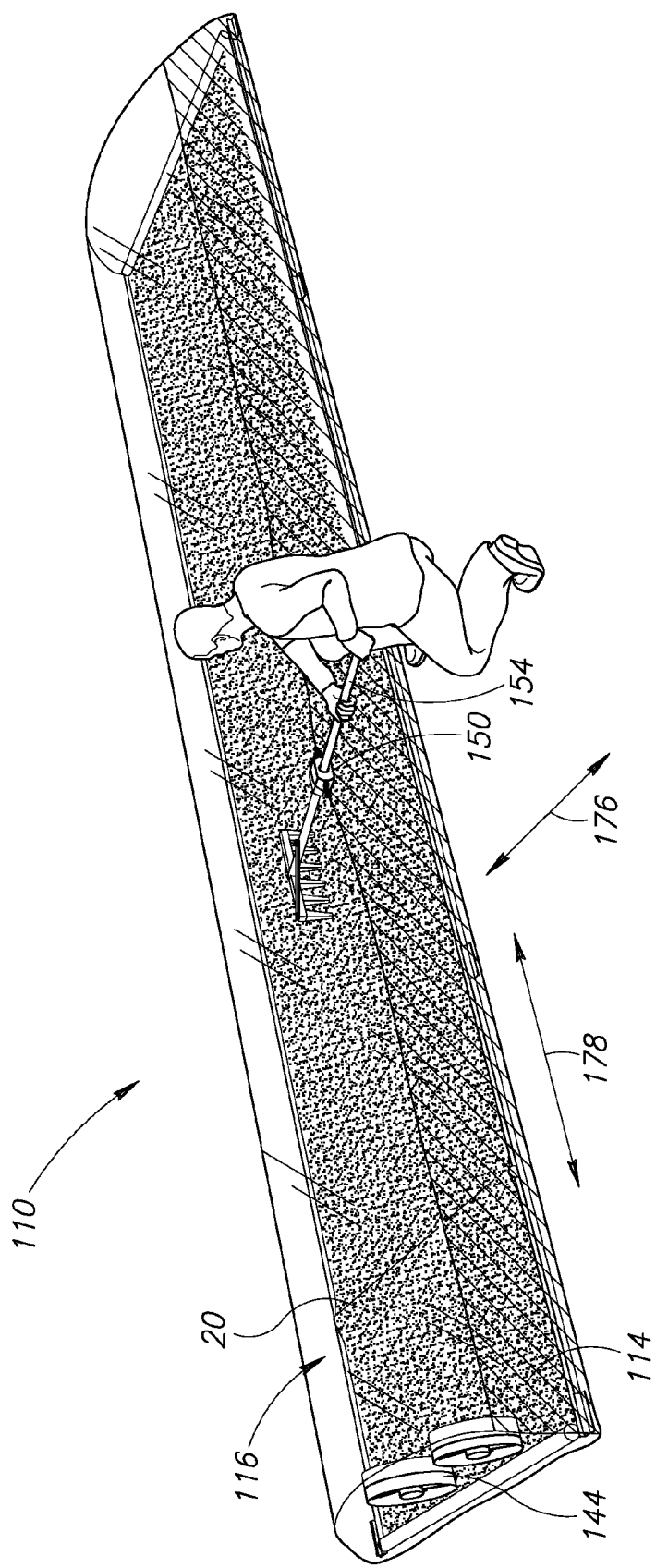

Moreover, the user can move remote utensil 50 from side to side along a length of solar dryer tunnel 10 by sliding holder 56 while still attached to zipper sliders 71 down a side length of solar dryer tunnel 10 in a second direction depicted by second arrows 78. Since zipper sliders 71 are attached to holder 56, cover 16 remains substantially closed during such a sliding movement. Thus, remote utensil 50 can be used to remotely and manually turn a commodity, such as grain, without a person entering solar dryer tunnel 10. Remote utensil 50 is shown in FIG. 7E in use with solar dryer tunnel 110. In some embodiments, both remote utensil 50 and rolling mechanism 20 are used to turn grain.

Figure 4:
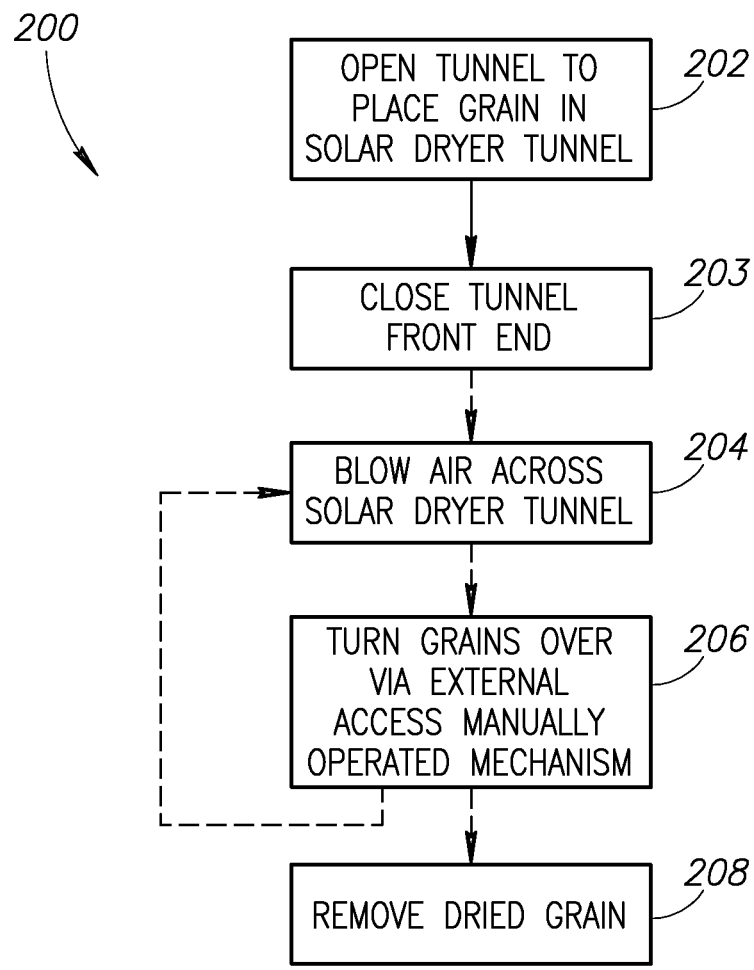
FIG. 4 is a flow-chart diagram of a method of drying grain, in accordance with embodiments of the invention.

Reference is now made to FIG. 4, which is a flow-chart diagram of a method 200 of drying a commodity, for example, grain or seeds, in accordance with embodiments of the invention. First, as an illustrative example, grains are placed (step 202) into a solar drying tunnel 10 or 110 through an open tunnel first end 40 or 140. Tunnel first end 40 or 140 is then closed (step 203). Next, air is blown (step 204) across solar drying tunnel 10 or 110 to expedite the drying and/or to keep cover 116 up. After a period of time, grains are turned over (step 206) via external access mechanism 100, which may include, but is not limited to rolling mechanism 20 and/or remote utensil 50, which is manually operable. The step of blowing air may be continuous during the drying period. The step of turning grain may be done multiple times. In embodiments of the invention, the period of time may range from one to several hours, and up to a day. In some cases, the period of time may be greater than a day. Grain, when determined to be dry, or dried to a specific level for the specific requirement, is then removed (step 208) from tunnel 10 or 110.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the invention.

What is claimed is:

1. A solar drying tunnel for drying of a commodity, the solar drying tunnel comprising:
    a bottom portion, said bottom portion having a width and length; and
    a transparent cover disposed over the length of the bottom portion, wherein a maximum height of said transparent cover is less than or equal to 60 centimeters, when fully held up, said transparent cover further comprising a zipper track and two zipper heads for opening and closing of said transparent cover; and
    a remote utensil attached to said zipper heads, said zipper track configured to create an opening for introduction of the remote utensil therethrough.

2. The solar drying tunnel of claim 1, wherein said bottom portion is comprised of black material.

3. The solar drying tunnel of claim 1, further comprising side portions surrounding said bottom portion.

4. The solar drying tunnel of claim 1, wherein said width of said bottom portion is approximately 3 meters and said length of said bottom portion is approximately 15 meters.

5. A system for drying of a commodity, the system comprising:
    a solar drying tunnel comprising:
        a bottom portion, said bottom portion having a width and length, said bottom portion configured to receive the commodity thereon;
        a transparent cover disposed over said bottom portion;
        a ventilator at one end of said bottom portion for blowing air in between said bottom portion and a top portion and thus at least partially keeping said top portion up; and
        a rolling mechanism positioned underneath said bottom portion, wherein said rolling mechanism can be manually and externally controlled, and wherein said rolling mechanism provides a moving ridge in said bottom portion as said rolling mechanism is moved along the length of the bottom portion.

6. The system of claim 5, wherein said bottom portion is comprised of black material.

7. The system of claim 5, further comprising side portions surrounding said bottom portion.

8. The system of claim 5, wherein a height of said transparent cover when air is blowing through said ventilator is less than or equal to 60 centimeters.

9. The system of claim 5, wherein said width of said bottom portion is approximately 3 meters and said length of said bottom portion is approximately 15 meters.

10. A system for drying of a commodity, the system comprising:
    a solar drying tunnel comprising:
        a bottom portion, said bottom portion having a width and length, said bottom portion configured to receive the commodity thereon;
        a transparent cover disposed over said bottom portion;
        a ventilator at one end of said bottom portion for blowing air in between said bottom portion and a top portion and thus at least partially keeping said top portion up; and
        a remote utensil for manually turning the commodity within the solar drying tunnel, said remote utensil having a raking portion, a handle extending from the raking portion, and a holder positioned on the handle, wherein said transparent cover comprises a zipper mechanism, and wherein said holder is attachable to said zipper mechanism, such that when said holder is attached to said zipper mechanism, said raking portion is positioned inside said solar dryer tunnel and said handle is positioned external to said solar dryer tunnel.

11. The system of claim 10, wherein said bottom portion is comprised of black material.

12. The system of claim 10, further comprising side portions surrounding said bottom portion.

13. The system of claim 10, wherein a height of said transparent cover when air is blowing through said ventilator is less than or equal to 60 centimeters.

14. The system of claim 10, wherein said width of said bottom portion is approximately 3 meters and said length of said bottom portion is approximately 15 meters.

* * * * *